United States Patent
Ito (10) Patent No.: US 8,031,797 B2
(45) Date of Patent: Oct. 4, 2011

(54) INTERFERENCE POWER ESTIMATING DEVICE AND INTERFERENCE POWER ESTIMATING METHOD

(75) Inventor: Akira Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 900 days.

(21) Appl. No.: 11/984,258

(22) Filed: Nov. 15, 2007

(65) Prior Publication Data

US 2008/0130804 A1 Jun. 5, 2008

(30) Foreign Application Priority Data

Nov. 30, 2006 (JP) .................................. 2006-323437

(51) Int. Cl.
*H04B 15/00* (2006.01)

(52) U.S. Cl. ........................................ 375/285; 375/346

(58) Field of Classification Search .................. 375/285, 375/346
See application file for complete search history.

(56) References Cited

U.S. PATENT DOCUMENTS

| 5,513,215 | A | * | 4/1996 | Marchetto et al. | 375/233 |
| 6,137,788 | A | * | 10/2000 | Sawahashi et al. | 370/342 |
| 6,507,605 | B1 | * | 1/2003 | Fukumoto et al. | 375/152 |
| 7,062,287 | B2 | * | 6/2006 | Nakamura et al. | 455/522 |
| 7,420,957 | B2 | * | 9/2008 | Kim et al. | 370/343 |
| 7,639,660 | B2 | * | 12/2009 | Kim et al. | 370/343 |
| 2005/0180534 | A1 | * | 8/2005 | Brotje et al. | 375/350 |

FOREIGN PATENT DOCUMENTS

JP 2005-012386 1/2005

* cited by examiner

*Primary Examiner* — Jean B Corrielus
(74) *Attorney, Agent, or Firm* — Fujitsu Patent Center

(57) ABSTRACT

The present invention relates to an interference power estimating device that estimates interference power with high accuracy. The interference power estimating device includes a reference symbol acquiring unit acquiring a reference symbol corresponding to each of the pilot symbols included in a received signal by symbol-averaging a reference signal including the pilot symbol being allocated in positions near in terms of time to each of the pilot symbols and having the number less than the number of the pilot symbols within one slot, and an estimating unit estimating interference power of the received signal by power-valuing each difference between each of the pilot symbols and the reference symbol corresponding to each of the pilot symbols acquired by the reference symbol acquiring unit.

12 Claims, 10 Drawing Sheets

INTERFERENCE POWER ESTIMATING DEVICE AND INTERFERENCE POWER ESTIMATING METHOD

BACKGROUND OF THE INVENTION

1. Field of the Invention

The present invention relates to an interference power estimating device and an interference power estimating method.

2. Description of the Related Art

An HSDPA (High Speed Downlink Packet Access) system is a communication system of which a status is given as a next generation version of a W-CDMA (Wideband Code Division Multiple Access) system. The HSDPA involves utilizing an adaptive modulation system for scheming to increase a communication speed. In the adaptive modulation system, a best modulation system is automatically selected corresponding a communication environment.

In the communication system using the adaptive modulation system such as the HSDPA, each of terminals transmits a CQI (Channel Quality Indicator) (quality of reception) based on an estimated value of SIR (Signal to Interference power Ratio) to the nearest base station. The base station selects a transmission format corresponding to the quality of reception of which the terminal notifies, thereby realizing a high throughput. Accordingly, this type of communication system requires each terminal to perform the SIR estimation with high accuracy.

Further, DPCH (Dedicated Physical CHannel) utilized in the W-CDMA is allocated individually to each terminal, whereby items of control information such as a pilot symbol and a TPC (Transmit Power Control) bit and user data are transmitted. The DPCH enables high-speed transmit power control (TPC) to be applied. In the DPCH, a degree of how much the transmission power is increased and decreased is determined based on a result of the SIR estimation, and hence accuracy of the SIR estimation exerts large influence on a quantity of traffic that can be handled by the system.

Figure 7:
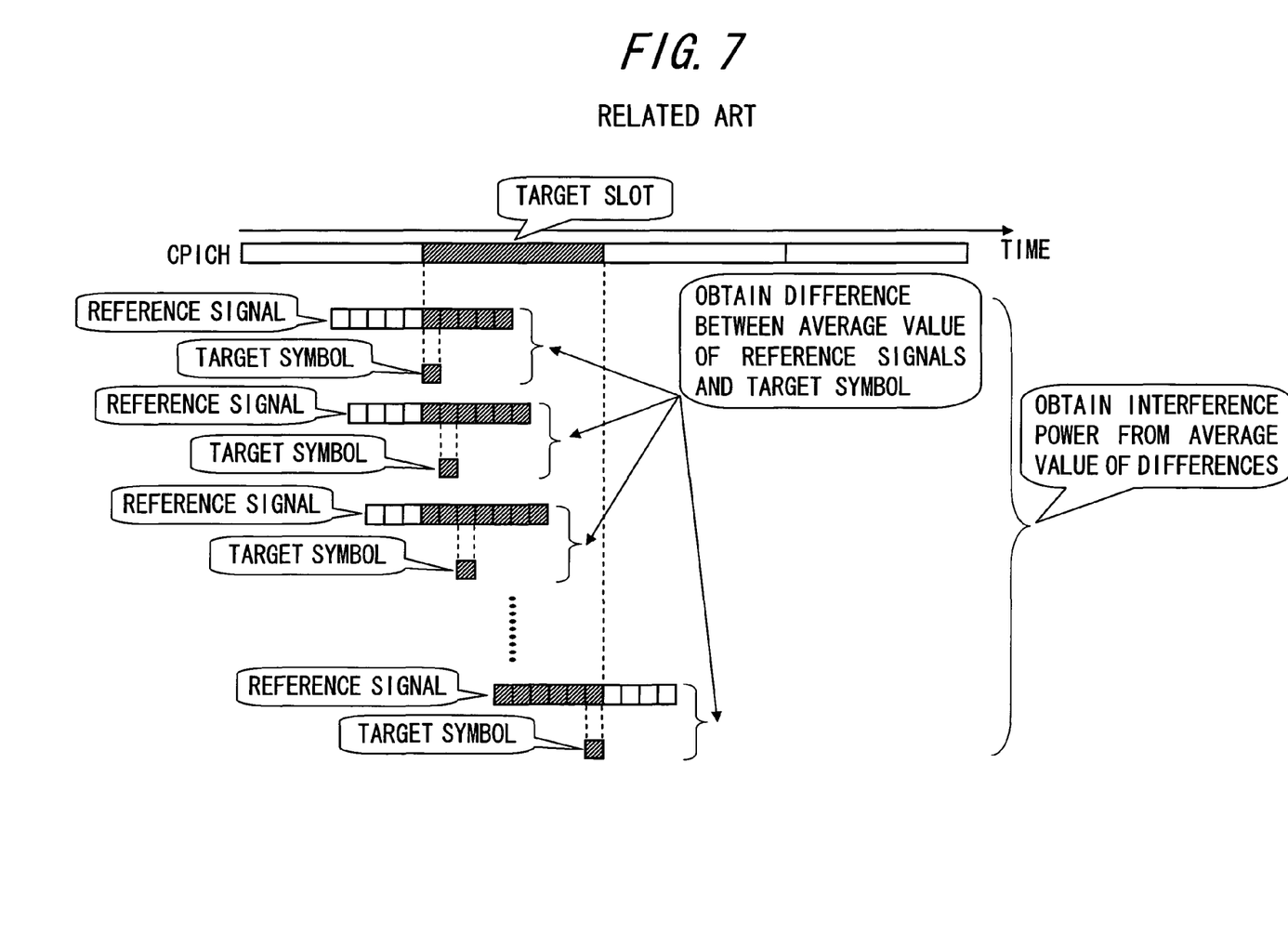
FIG. 7 is a diagram showing an interference power estimating method in the related art.

This type of SIR estimation involves estimating reception power and interference power, and an SIR value is obtained from a ratio of the reception power to the interference power that are output based on their estimations. The interference power is estimated generally by a method as illustrated in FIG. 7. FIG. 7 is a conceptual diagram showing an interference power estimating method according to the related art. FIG. 7 illustrates an example in which the interference power in a slot depicted by oblique lines in CPICH (Common Pilot CHannel) is an estimation target.

The conventional interference power estimating method involves calculating noise power about each piece of pilot symbol data allocated to the estimation target slot, calculating an average value of the noise power about the estimation target slot, and outputting the average value as interference power of the estimation target slot. The noise power about each pilot symbol is, according to the example in FIG. 7, obtained by power-valuing a difference between each pilot symbol and the average value of the pilot symbols (the reference signal) for 1-slot time with each pilot symbol being centered.

Figure 8:
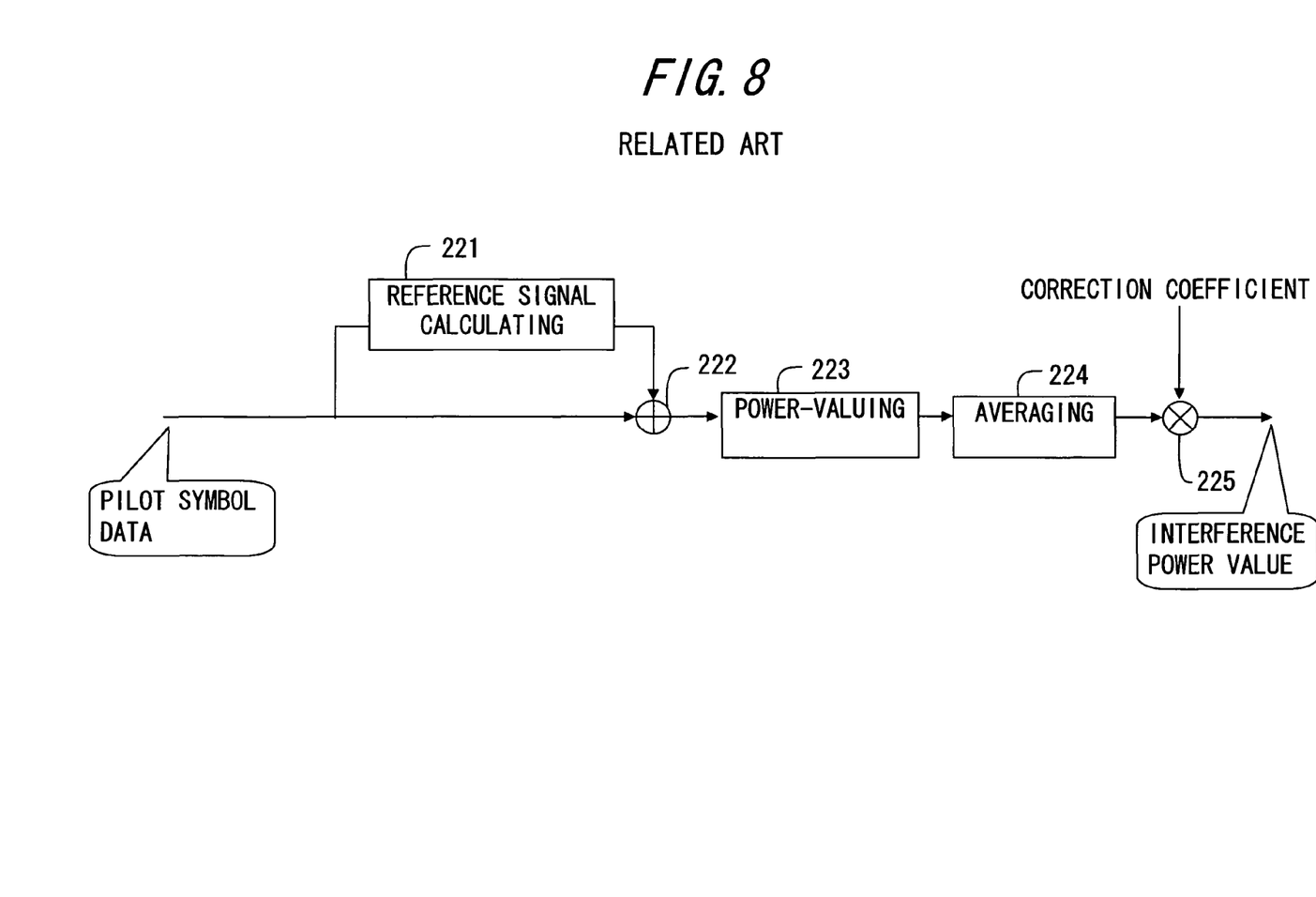
FIG. 8 is a diagram showing a functional configuration of a conventional interference power estimating circuit.

FIG. 8 is a diagram illustrating function blocks of the conventional interference power estimating circuit. In the conventional interference power estimating circuit, when the pilot symbol data is inputted, a reference signal calculating unit 221 extracts the reference signals for 1-slot time with the inputted pilot symbol data being centered, and acquires an average value of the reference signals. Subsequently, a subtracter 222 obtains a difference between each piece of the inputted pilot symbol data and the average value of the reference signals, then a power-valuing unit 223 squares the difference value, and the squared value is output as the noise power.

With respect to the target slot, the noise power about the respective pieces of pilot symbol data output from the power-valuing unit 223 is added up, and the added noise power is divided by the number of symbols in the target slot, thus, the average value of the noise power is calculated (an averaging unit 224). The thus-calculated average value of the noise power is multiplied by a correction coefficient (multiplier 225), thereby, an interference power value of the target slot is obtained.

The correction coefficient is a value to be multiplied in a way that takes account of an error between the reference signal average value calculated by the reference signal calculating unit 221 and an ideal value. Namely, the correction coefficient is a value for correction the bias, wherein the bias is caused by a result that the reference signal is biased to the target pilot symbol data because the target pilot symbol data is equal to one symbol in the reference signal. The example in FIG. 7 shows that one slot consists of 10 pilot symbols, an average value of the 10 pilot symbols are utilized, and therefore the correction coefficient becomes 10/9.

In this type of conventional interference power estimating circuit, if a CDMA communication system is utilized for obtaining the pilot symbol data, the pieces of pilot symbol data are RAKE-received in order to reduce multi-path interference. The RAKE-reception is a technique for increasing reception power by separating each delay wave from the signals overlapped with the delay waves due to the multi-paths and synthesizing after conducting synchronous detection. The synchronous detection involves using a channel estimation value for adjusting phases of the respective delay waves.

Figure 9:
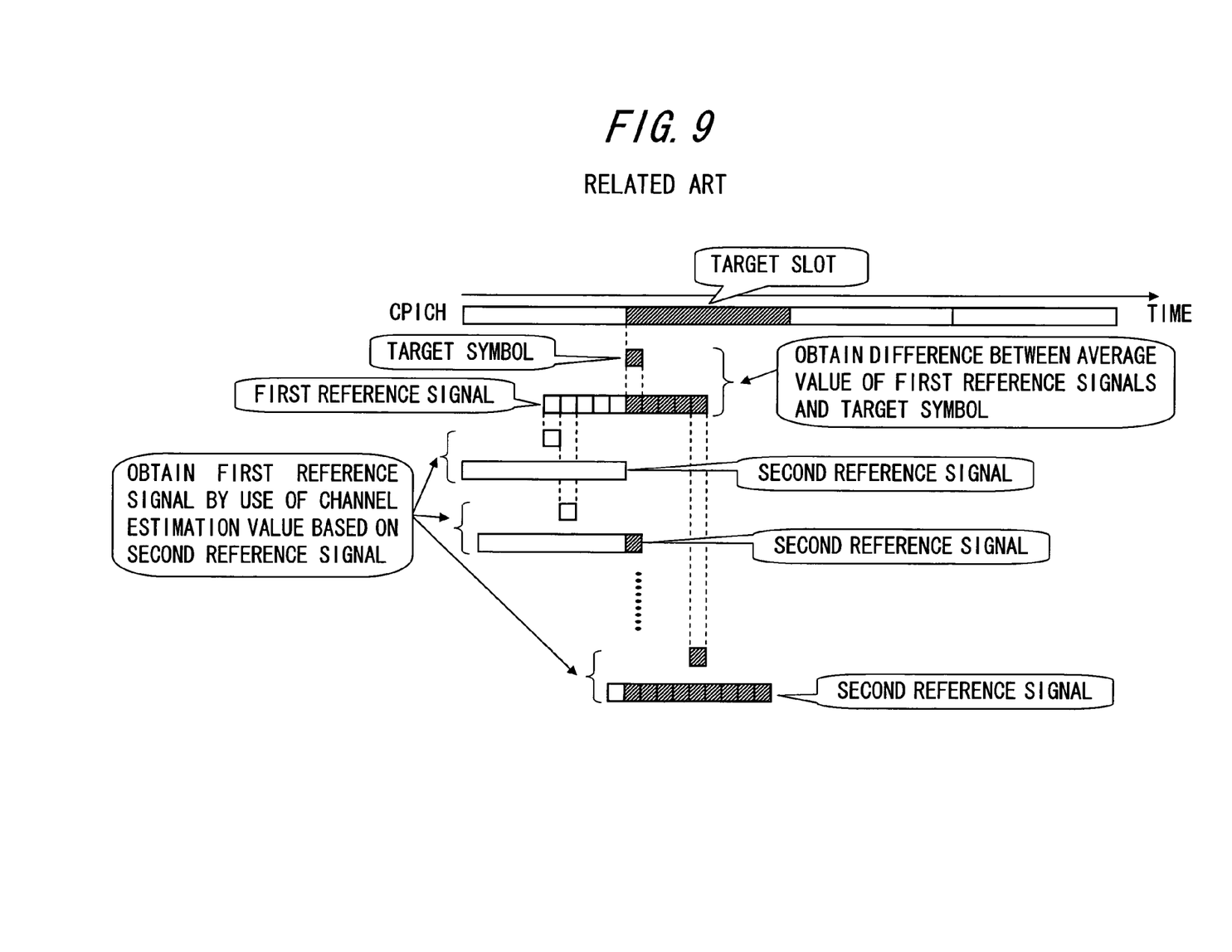
FIG. 9 is a diagram showing a method of outputting a reference signal (first reference signal) by the related art.

The channel estimation value is, as illustrated in FIG. 9, calculated from the target pilot symbol and an average (a long-term average (movement average)) of a predetermined number of pilot symbols with the target pilot symbol being centered. FIG. 9 is a diagram showing a method of outputting the reference signal (a first reference signal) according to the related art. FIG. 9 illustrates the method of outputting the first reference signal for obtaining a noise component related to the head pilot symbol in the target slot shown in FIG. 7. The first reference signal in FIG. 9 represents the reference signal that is referred to for obtaining the interference power illustrated in FIG. 7.

Figure 10:
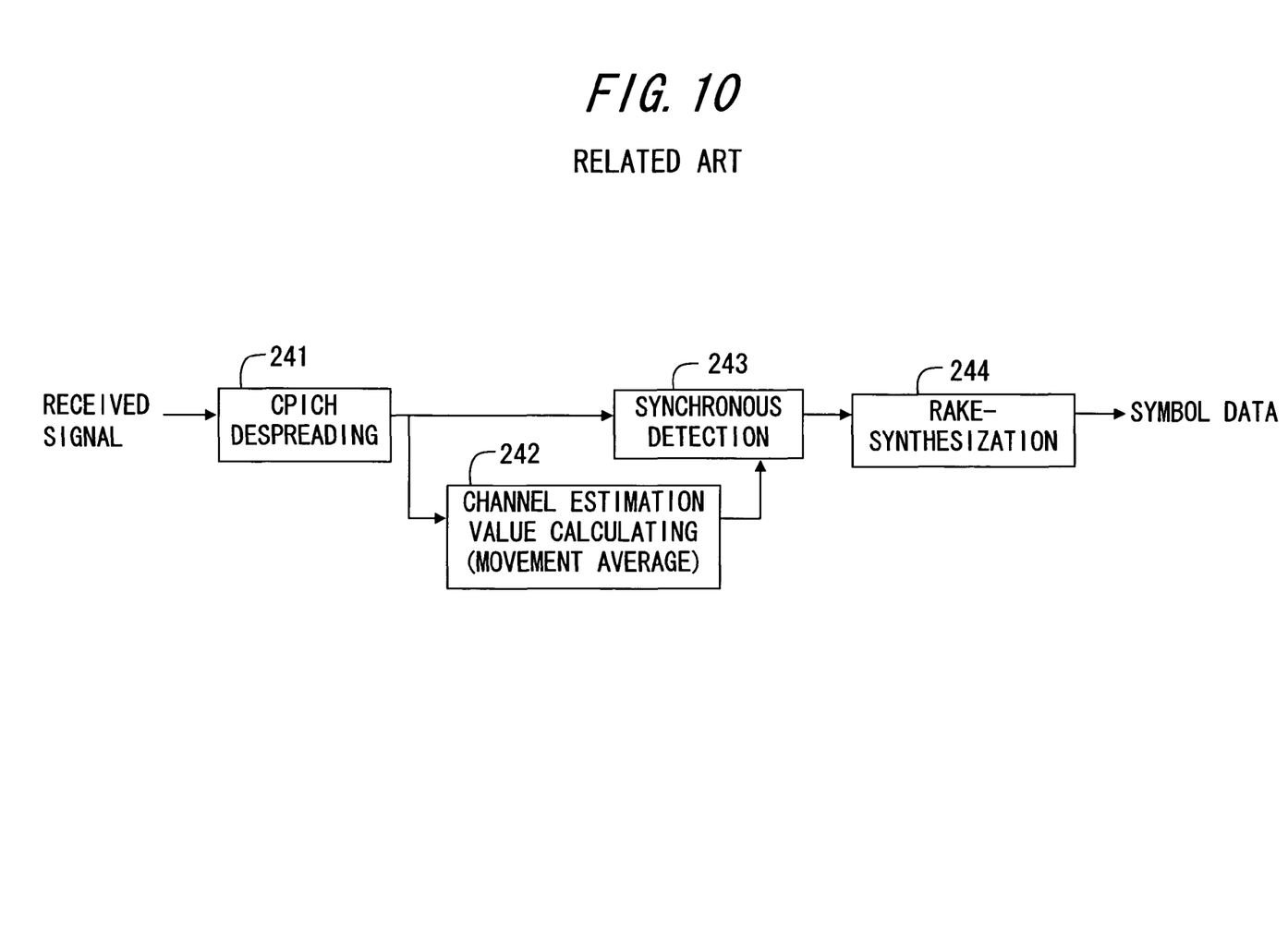
FIG. 10 is a diagram showing a functional configuration of a conventional reference signal (first reference signal) output circuit.

The example in FIG. 9 is that the reference signal (which will hereinafter be termed a second reference signal) for 1-slot time with each data symbol being centered, is used for outputting the respective data symbols of the first reference signal. FIG. 10 is a diagram showing function blocks of a conventional reference signal outputting circuit.

In the conventional reference signal outputting circuit, when the received signal is despread (a CPICH despreading unit 241) with a spreading code for CPICH at timing corresponding to each path, the despread pilot signal corresponding to each path is synchronously detected (a synchronous detection unit 243). The synchronous detection unit 243 takes phase-synchronization of the pilot signals corresponding to the respective paths by multiplying the pilot signals corresponding to the respective paths by the channel estimation values, corresponding to the respective paths, calculated by the channel estimation value calculating unit 242. Thus, a RAKE-synthesization unit 244 synthesizes the pilot signals that have been phase-synchronized, thereby outputting the pilot symbols.}

The channel estimation value calculating unit 242 calculates the channel estimation value by use of the average value of the pilot symbols (the second reference signal) for 1-slot time with each pilot symbol being centered in order to synchronously detect each of the pilot symbols.

The conventional interference power estimating method has, however, a problem that fluctuations of the signal components in a fast fading environment are treated as noises. A noise increment derived from the fluctuations of the signal components does not become a factor for a decline of demodulating capability.

Accordingly, the execution of the SIR estimation with high accuracy entails realizing the interference power estimating method capable of the estimation in a way that does not treat the fading fluctuations as the noises.

SUMMARY OF THE INVENTION

It is an object of the present invention to provide an interference power estimating device that estimates the interference power with the high accuracy.

The present invention adopts the following configurations in order to solve the problems. Namely, according to a first mode of the present invention, an interference power estimating device comprises a reference symbol acquiring unit acquiring a reference symbol corresponding to each of the pilot symbols included in a received signal by symbol-averaging a reference signal including the pilot symbol being allocated in positions near in terms of time to each of the pilot symbols and having the number less than the number of the pilot symbols within one slot, and an estimating unit estimating interference power of the received signal by power-valuing each difference between each of the pilot symbols and the reference symbol corresponding to each of the pilot symbols, which is acquired by the reference symbol acquiring unit.

According to the first mode, when estimating the interference power of the received signal, the difference between each of the pilot symbols included in the received signal and the reference symbol acquired corresponding to the pilot symbol, is calculated. Then, each reference symbol is acquired by symbol-averaging the reference signal including the pilot symbol of which the number is less than the number of pilot symbols within one slot, which is/are allocated in positions near in terms of time to the corresponding pilot symbols.

Namely, according to the first mode, the data of the components near in terms of time are used for estimating the interference power.

With this scheme, according to the first mode of the present invention, the interference power can be estimated based on the proper data without treating the fading fluctuations as the noise components. By extension, it is possible to estimate the interference power and the SIR with the high accuracy even in the fading environment.

Further, the reference symbol acquiring unit may acquire each reference symbol corresponding to each pilot symbol by symbol-averaging the reference signal including the pilot symbol and pilot symbols anterior and posterior to the pilot symbol.

Still further, the reference symbol acquiring unit may set each reference symbol corresponding to each pilot symbol as a pilot symbol neighboring to the pilot symbol.

Yet further, the reference signal assembled by the reference symbol acquiring unit may be changed over so that the number of the pilot symbols becomes smaller as the self-device moving speed estimated by the speed estimating unit becomes higher.

According to this scheme, a type of the reference signal used for a comparison with each pilot symbol in the interference power estimation is determined corresponding to the moving speed. Namely, as the moving speed is higher, the pilot symbol data, which are nearer in terms of time, is/are used as the reference signal.

With this scheme, according to the first mode of the present invention, the interference power can be estimated based on the proper data corresponding to the moving speed of the self-device.

Moreover, the interference power estimating device according to the first mode of the present invention may further comprise a correcting unit correcting the interference power estimated by the estimating unit with a predetermined correction value, wherein the correcting unit may determine the predetermined correction value so as to correct a bias of the reference symbol to the target pilot symbol, corresponding to a structure of the reference signal that is changed over based on the moving speed estimated by the speed estimating unit.

With this scheme, the reference signal includes the corresponding pilot symbol, and the reference symbol data acquired from the reference signal takes a value biased to the corresponding pilot symbol, in which case the interference power to be estimated with the correction value corresponding to the bias is corrected.

With this scheme, even when the structure of the reference signal is changed over corresponding to the moving speed of the self-device, the interference power is estimated with the high accuracy each time.

Next, according to a second mode of the present invention, an interference power estimating device estimates interference power of a received signal by power-valuing each difference between each of pilot symbols included in the received signal and a symbol-average of a plurality of pilot symbols allocated in positions near to each of the pilot symbols and further slot-averaging the power-valued differences and comprises a detecting unit synchronously detecting each of the pilot symbols of the power-valuing target and a plurality of pilot symbols that are referred to for obtaining a difference from the pilot symbol of the power-valuing target by use of a channel estimation value obtained in a way that uses in common a symbol average of a plurality of pilot symbols within an interference power estimation target slot.

Namely, in the interference power estimating device according to the second mode, the pilot signals used when calculating the channel estimation value on a slot basis for estimating the interference power, are commonized.

With this scheme, according to the second mode, the channel estimation values are commonized on the unit for obtaining the interference power, thereby enabling the channel estimation to be restrained from being affected by occurrence of the fading fluctuations.

It should be noted that the detecting unit in the second mode may be applied to the interference power estimating device in the first mode described above. The present invention may also be a hardware circuit or a program that realizes any one of the interference power estimating functions described above.

According to the present invention, it is feasible to realize the interference power estimating device that estimates the interference power with the high accuracy.

DESCRIPTION OF THE PREFERRED EMBODIMENTS

An interference power estimating device in each of embodiments of the present invention will hereinafter be described with reference to the drawings. It is to be noted that configurations in the following embodiments are exemplifications, and the present invention is not limited to the configurations in the embodiments.

First Embodiment

The interference power estimating device in a first embodiment of the present invention will hereinafter be explained.

[Configuration of Device]

Figure 1:
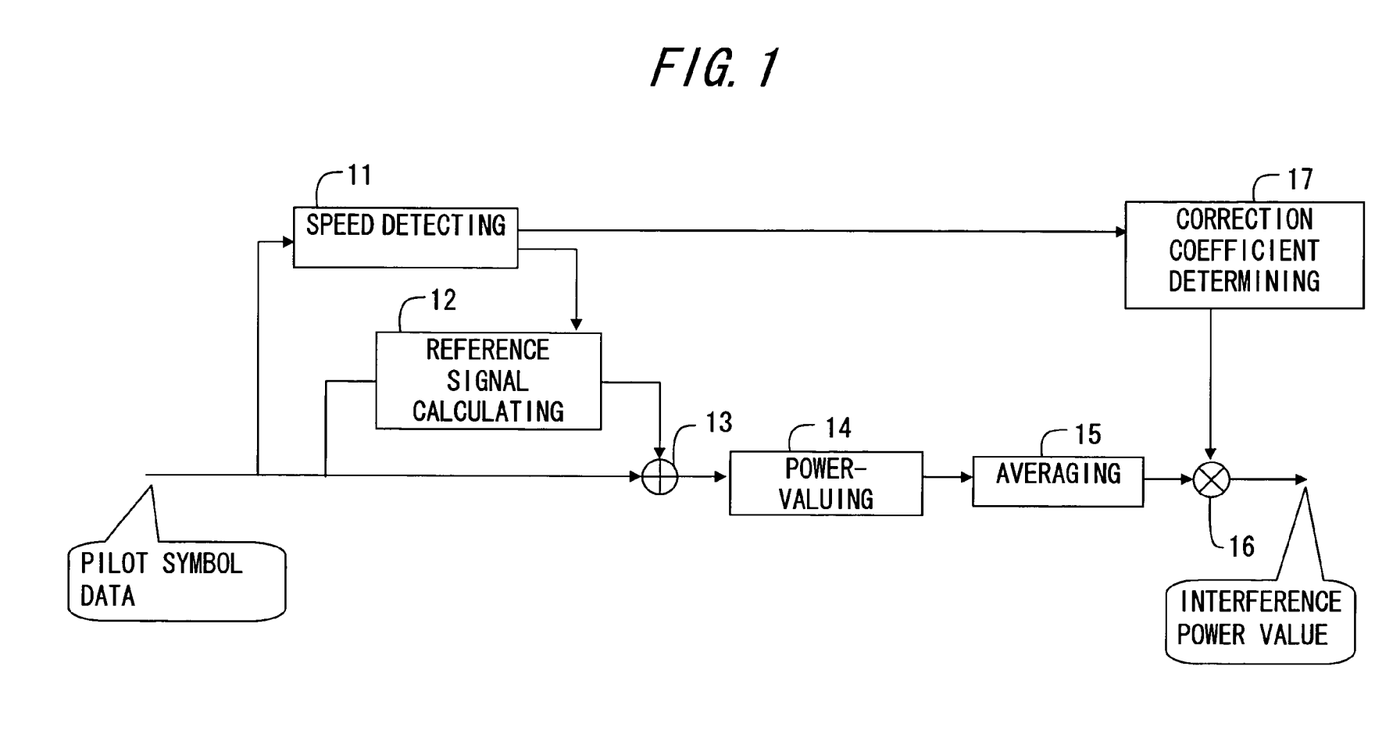
FIG. 1 is a diagram showing a functional configuration of an interference power estimating device in a first embodiment.

To begin with, a functional configuration of the interference power estimating device in the first embodiment will be described with reference to FIG. 1. FIG. 1 is a block diagram illustrating the functional configuration of the interference power estimating device in the first embodiment. The interference power estimating device in the first embodiment includes a speed detecting unit 11, a reference signal calculating unit 12, a subtracting unit 13, a power-valuing unit 14, an averaging unit 15, a multiplying unit 16 and a correction coefficient determining unit 17. These function units may be configured as hardware circuits that realize the respective functions, and may also be configured so as to be realized in such a way that a control program stored in a memory etc. is executed on a CPU (Central Processing Unit). The speed detecting unit 11 corresponds to the speed estimating unit according to the present invention, the reference signal calculating unit 12 corresponds to the reference symbol acquiring unit according to the present invention, the subtracting unit 13, the power-valuing unit 14 and the averaging unit 15 correspond to the estimating unit according to the present invention, and the multiplying unit 16 and the correction coefficient determining unit 17 correspond to the correcting unit according to the present invention.

The speed detecting unit 11, when receiving a pilot signal (pilot symbol data), calculates a fading frequency about the pilot signal. The speed detecting unit 11 compares the thus-calculated fading frequency with a predetermined threshold value, thereby generating speed information. The predetermined threshold value may be previously retained adjustably in the memory etc. The generated speed information is information representing a moving speed of the interference power estimating device itself serving as a receiving device in the first embodiment, and is determined, for example, in the following manner.

The speed detecting unit 11 determines the speed information to be [0 (low speed)] if the fading frequency is less than a first threshold value (e.g., 200 Hertz (Hz)), determines the speed information to be [1 (intermediate/high speed)] if the fading frequency is equal to or higher than the first threshold value but less than a second threshold value (e.g., 300 Hertz (Hz)), and determines the speed information to be [2 (high speed)] if the fading frequency is equal to or higher than the second threshold value. The thus-determined speed information is transferred to the reference signal calculating unit 12 and the correction coefficient determining unit 17.

Note that the fading frequency calculating method may involve using a general type of method, and therefore its explanation is herein omitted. A method disclosed in International Publication No. WO2004/068749 may be applied, as a method capable of estimating the fading frequency at a high speed with high accuracy, to the speed detecting unit 11 in the first embodiment.

The reference signal calculating unit 12, when receiving a pilot signal, acquires from this pilot signal each of reference signals corresponding to each of the pilot symbols sent to the subtracting unit 13. The reference signal is defined as pilot symbol data for a predetermined count (a predetermined period of time). Hereat, the reference signal calculating unit 12 recognizes a type of the should-be-acquired reference signal from the speed information of which the speed detecting unit 11 notifies. The pilot symbol data serving as a basis of the reference signal to be acquired, might involve in some cases utilizing the pilot symbol data inputted earlier and retained in the memory etc. Further, data, which is the pilot symbol data serving as the basis of the reference signal and is allocated posterior to a target pilot symbol, may wait for the pilot symbol to be inputted via a delay circuit etc. The acquired reference signal is time-averaged and acquired as a reference symbol having a 1-pilot-symbol length. The reference symbol data, after being time-averaged, is transmitted to the subtracting unit 13.

Figure 2:
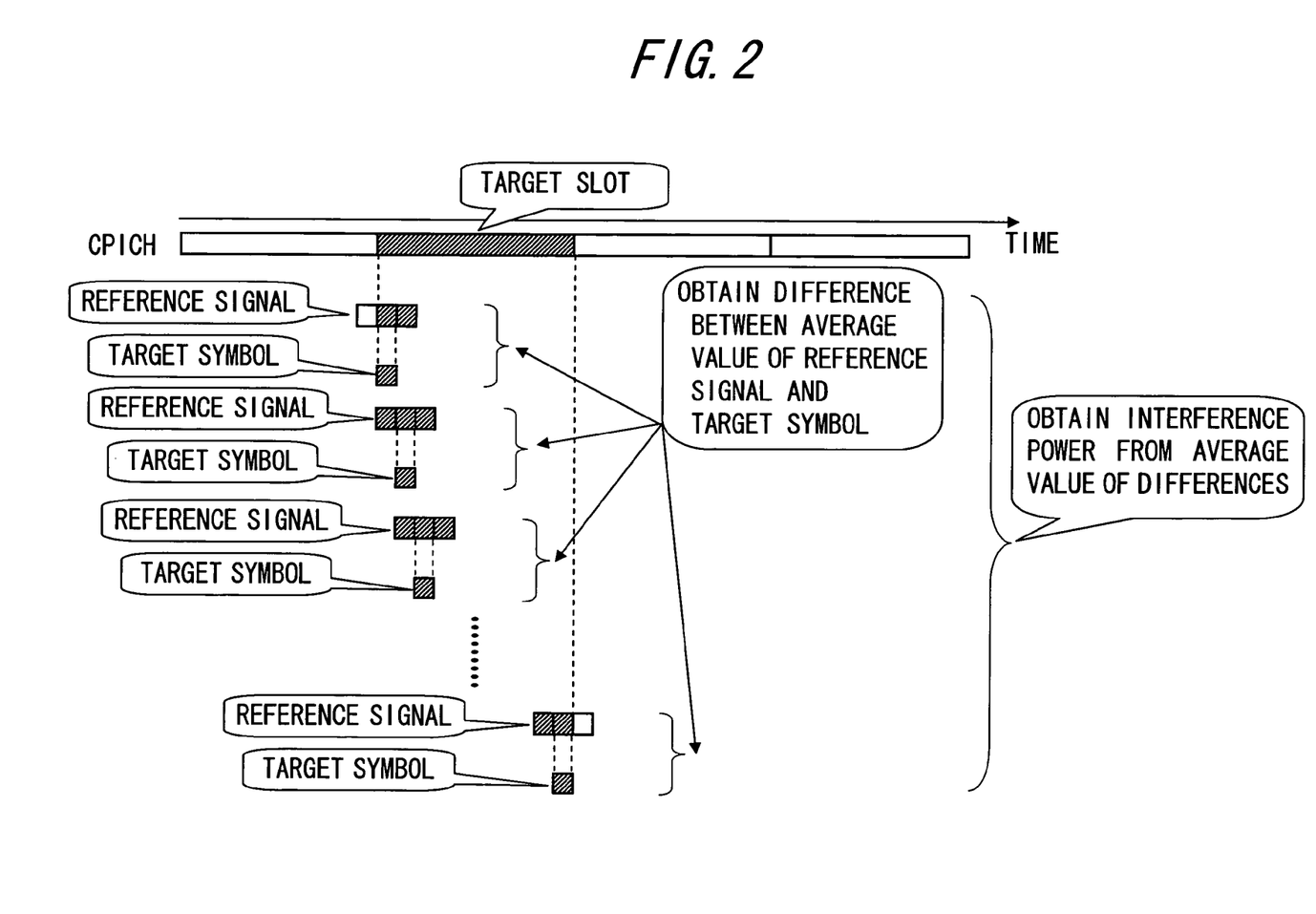
FIG. 2 is a diagram showing a first interference power estimating method.
Figure 3:
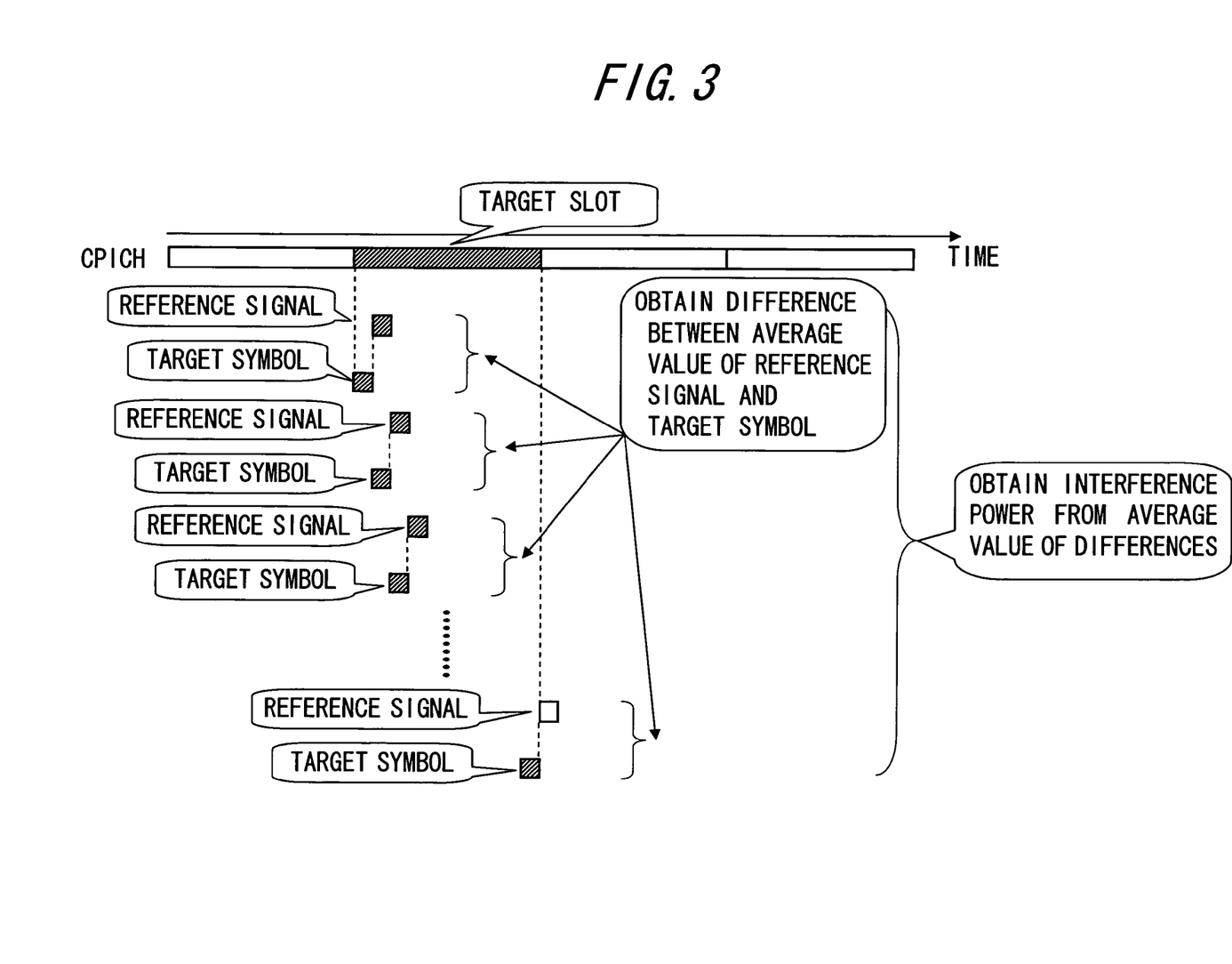
FIG. 3 is a diagram showing a second interference power estimating method.

FIGS. 2 and 3 are diagrams illustrating first and second interference power estimating methods. The first method illustrated in FIG. 2 is that the reference signal acquired by the reference signal calculating unit 12 is acquired in the form of containing the target pilot symbol data and the pilot symbol data each for one symbol, allocated anterior and posterior to the target symbol data. Namely, the reference signal having a 3-symbol length with the target symbol being centered is obtained. On the other hand, the second method illustrated in FIG. 2 is that the reference signal acquired by the reference signal calculating unit 12 is the pilot symbol data posterior by one symbol to the target pilot symbol.

The reference signal calculating unit 12 recognizes, from the speed information of which the speed detecting unit 11 notifies, which method should be adopted, and acquires the reference signal conforming with this method. For example, the reference signal calculating unit 12 acquires the reference signal for 1-slot time as illustrated in FIG. 7 if the speed information indicates [0 (low speed)], acquires the reference signal having the 3-symbol length as illustrated in FIG. 2 if the speed information indicates [1 (intermediate/high speed)], and acquires the reference signal having the 1-symbol length as illustrated in FIG. 3 if the speed information indicates [2 (high speed)].

The subtracting unit 13 takes a difference between each piece of pilot symbol data to be inputted and the reference symbol data to be output from the reference signal calculating unit 12 so as to correspond to the pilot symbol data. An available scheme is that the pilot symbol data subjected to a subtracting process and the reference symbol corresponding thereto are inputted in a synchronized state to the subtracting unit 13. The calculated difference value is sent to the power-valuing unit 14.

The power-valuing unit 14 acquires a noise power value by squaring the difference value transferred from the subtracting unit 13. The acquired noise power value is sent to the averaging unit 15.

The averaging unit 15 sums up the noise power values corresponding to the respective pilot symbols sent from the power-valuing unit 14 per slot to which the pilot symbols are allocated, and divides the sum of the noise power values by the number of pilot symbols within the slot, thereby obtaining an average of the noise power values of each slot. The thus-obtained averages of noise power values of the respective slots are sequentially transmitted to the multiplying unit 16.

The correction coefficient determining unit 17 determines, from the speed information of which the speed detecting unit 11 notifies, a correction coefficient that should be multiplied. The correction coefficient is a value multiplied in a way of taking account of an error between the reference symbol data calculated by the reference signal calculating unit 12 and an actual value (ideal value) of the pilot symbol corresponding thereto in a way of taking account of an error. The reference symbol data is a value into which the reference signal (the received pilot signal) having a predetermined length is averaged to a symbol length, and therefore takes a value biased to the target pilot symbol. Such being the case, the correction coefficient is used as a value for correcting the bias of the reference symbol data to the target pilot symbol data.

In the case of adopting the first method in FIG. 2, the average of the 3-symbol reference signal is set as the reference symbol data, and hence the correction coefficient becomes 3/2. On the other hand, in the case of adopting the second method in FIG. 3, the 1-symbol reference signal is set as the reference symbol data, and therefore the correction coefficient becomes 1/2.

The correction coefficient determining unit 17 determines the correction coefficient by use of a table retained in the memory etc, wherein the speed information of which the speed detecting unit 11 notifies is associated with the correction coefficient. For example, the correction coefficient determining unit 17 determines the correction coefficient to be 10/9 when the speed information indicates [0 (low speed)], determines the correction coefficient to be 3/2 when the speed information indicates [1 (intermediate/high speed)], and determines the correction coefficient to be 1/2 when the speed information indicates [2 (high speed)].

The multiplying unit 16 multiplies the correction coefficient sent from the correction coefficient determining unit 17 by the average noise power value of each slot that is sent from the averaging unit 15. The thus-obtained value is output as an interference power value of the slot.

Operation and Effect in First Embodiment

In the interference power estimating device in the first embodiment, as described above, the speed detecting unit 11 estimates the fading frequency about the received pilot signal, and the moving speed of the self-device is estimated based on the fading frequency. Subsequently, the reference signal calculating unit 12 acquires the reference signal to be referred to for obtaining the noise power related to each pilot symbol, corresponding to the estimated moving speed. If the moving speed is determined to be low, the pilot symbol having the 1-slot time length is acquired as the reference signal. If the moving speed is determined to be intermediate/high, the target symbol and the pilot symbols anterior and posterior to this target symbol are acquired as the reference signal in order to make the target symbol and the reference signal near to each other in terms of time. If the moving speed is determined to be high, the pilot symbol posterior to the target symbol is acquired as the reference signal.

Calculated is a difference between the reference symbol data acquired based on the time-average of the reference signal corresponding to the moving speed and the target pilot symbol. Then, the difference is converted into the noise power value. When acquiring the noise power values of the respective pilot symbols, an average value of the noise power values about the target slot is taken.

Finally, the average noise power value about the target slot is multiplied by the correction coefficient that is determined corresponding to the moving speed (the type of the reference signal), thereby outputting the interference power value of the target slot.

Thus, in the first embodiment, the type of the reference signal, which is used for a comparison with each pilot symbol in estimating the interference power, is determined corresponding to the moving speed. Namely, as the moving speed is higher, the pilot symbol data, which is nearer in terms of time, is employed as the reference signal.

With this scheme, according to the first embodiment, based on such a characteristic of fading fluctuations that the signal component, which is farther in terms of time, has a larger difference and the noise appears larger, the interference power can be estimated from the proper data without treating the fading fluctuations as the noise components. By extension, it is feasible to estimate the interference power and the SIR with high accuracy even in the fading environment.

Second Embodiment

The interference power estimating device in a second embodiment of the present invention will hereinafter be described. The interference power in the first embodiment discussed earlier realizes the interference power estimation with the high accuracy in the process after inputting the pilot symbol data used for estimating the interference power. The interference power estimating device in the second embodiment adds a further contrivance to the process of acquiring the pilot symbol data inputted to the interference power estimating device in the first embodiment, and thereby realizes the interference power estimation with much higher accuracy. It should be noted that the interference power estimating device in the second embodiment receive the signals transmitted by the CDMA communication system.

[Configuration of Device]

Figure 4:
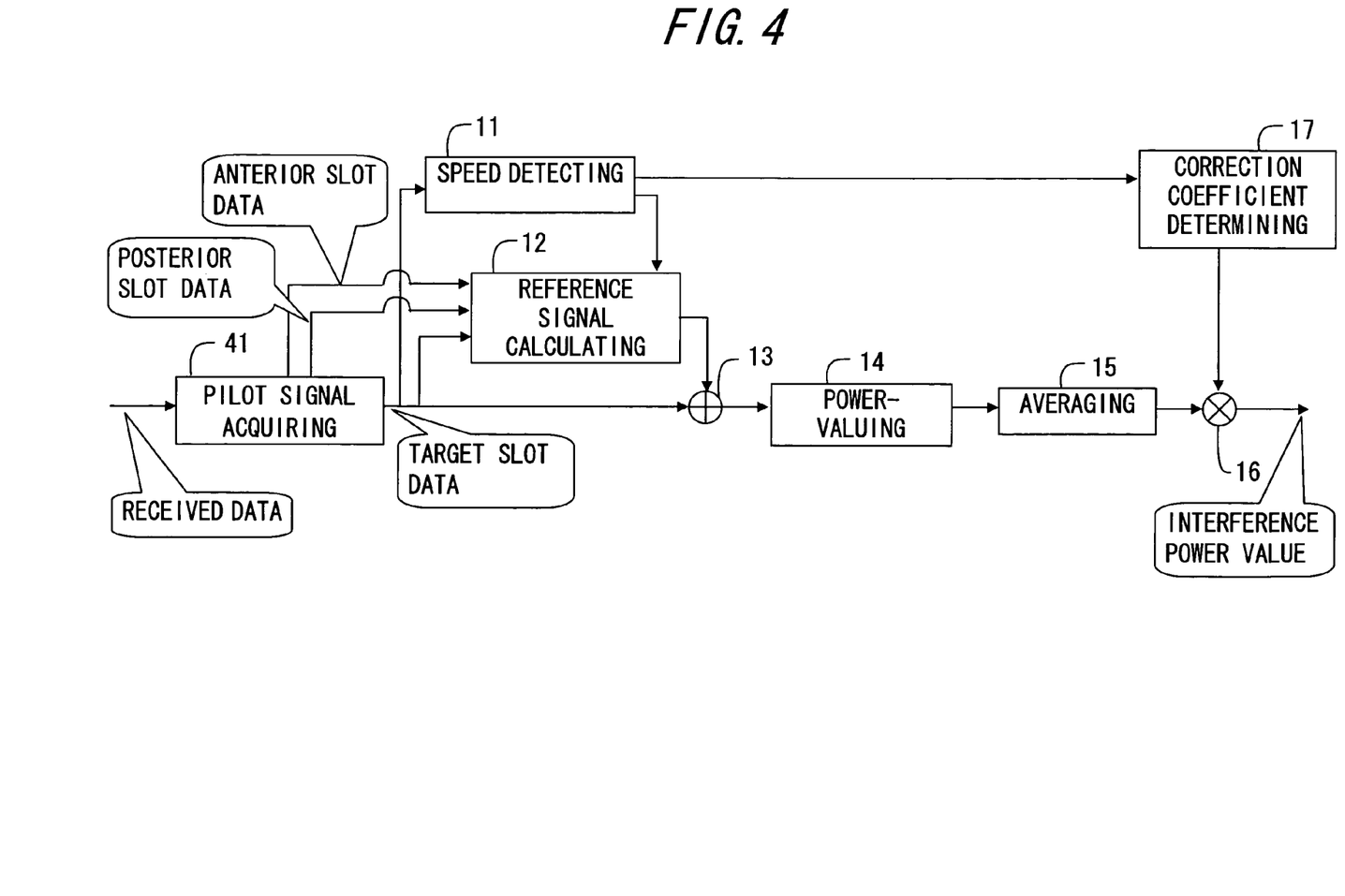
FIG. 4 is a diagram showing a functional configuration of the interference power estimating device in a second embodiment.
Figure 5:
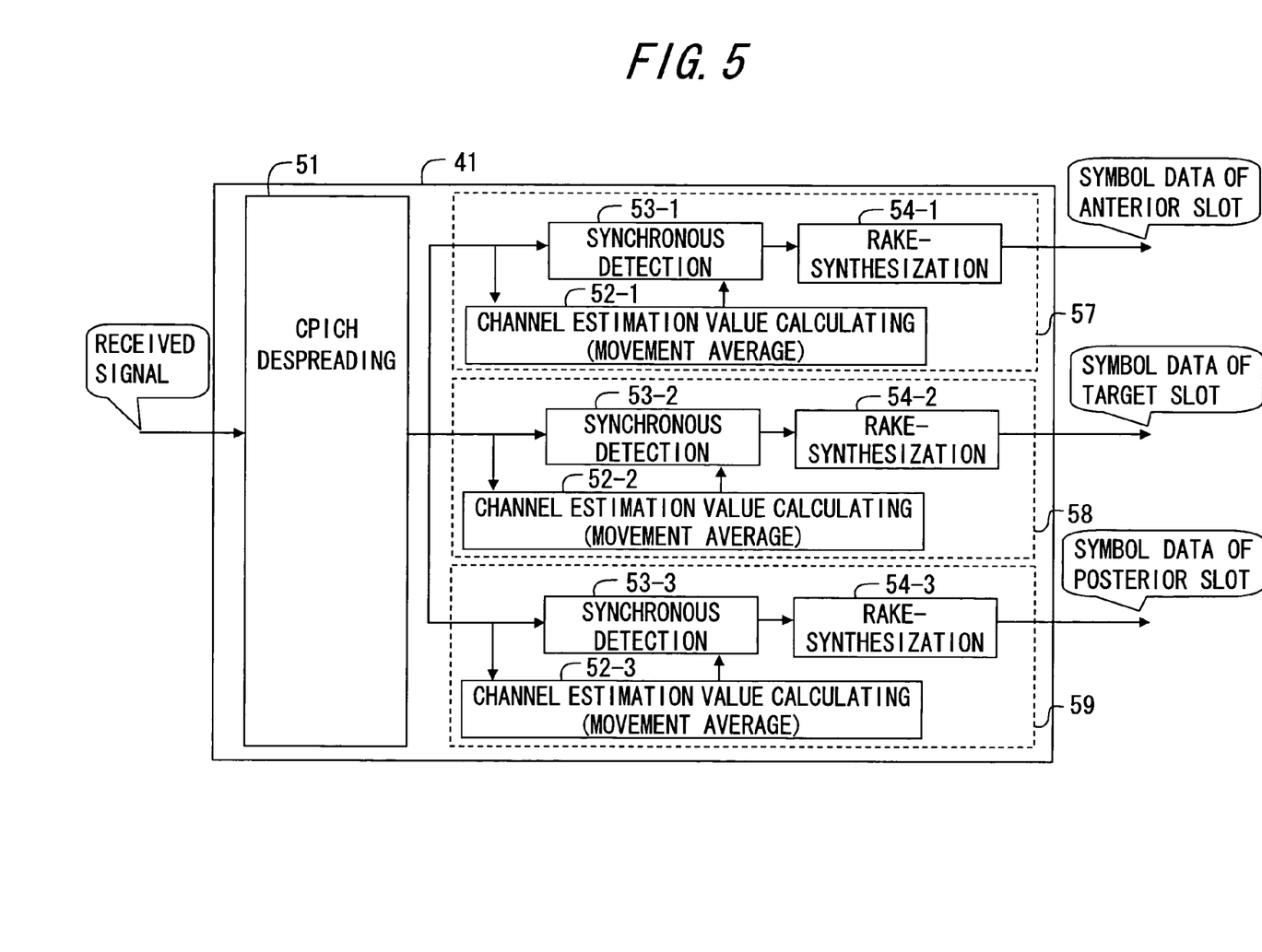
FIG. 5 is a diagram showing a functional configuration of a pilot signal acquiring unit 41 of the interference power estimating device in the second embodiment.

A functional configuration of the interference power estimating device in the second embodiment will hereinafter be described with reference to FIGS. 4 and 5. FIG. 4 is a block diagram illustrating the functional configuration of the interference power estimating device in the second embodiment. FIG. 5 is a diagram showing a functional configuration of a pilot signal acquiring unit 41 of the interference power estimating device in the second embodiment.

The interference power estimating device in the second embodiment further includes the pilot signal acquiring unit 41 as a function of acquiring the pilot symbol data inputted in the functional configuration in the first embodiment. The functions other than this are substantially the same as those in the first embodiment, and hence their explanations are simplified. The pilot signal acquiring unit 41 corresponds to the channel estimating unit and the detecting unit according to the present invention.

From the pilot signal acquiring unit 41, pilot symbol data (main pilot signal) as a target for the interference power estimation is output together with the pilot symbol data of an anterior slot and the pilot symbol data of a posterior slot that are referred to for obtaining noise power about the symbol on an estimation target slot basis. The main pilot signal is inputted to each of the speed detecting unit 11, the reference signal calculating unit 12 and the subtracting unit 13. The pieces of pilot symbol data of the anterior slot and of the posterior slot, which are referred to for estimating the interference power of the main pilot signal, are sent to the reference signal calculating unit 12. The reference signal calculating unit 12 uses, if necessary for acquiring a predetermined reference signal, the pieces of pilot symbol data of the anterior slot and the posterior slot that are sent from the pilot signal acquiring unit 41.

The pilot signal acquiring unit 41 includes, as illustrated in FIG. 5, a CPICH despreading unit 51, channel estimation value calculating units 52-1, 52-2, 52-3, synchronous detection units 53-1, 53-2, 53-3, and RAKE-synthesization units 54-1, 54-2, 54-3. Among these components, an anterior slot data processing system 57 is constructed of the channel estimation value calculating unit 52-1, the synchronous detection unit 53-1 and the RAKE-synthesization unit 54-1, a target slot data processing system 58 is constructed of the channel estimation value calculating unit 52-2, the synchronous detection unit 53-2 and the RAKE-synthesization unit 54-2, and a posterior slot data processing system 59 is constructed of the channel estimation value calculating unit 52-3, the synchronous detection unit 53-3 and the RAKE-synthesization unit 54-3. These function units may be configured as hardware circuits that realize the respective functions, and may also be configured so as to be realized in such a way that the control program stored in the memory etc. is executed on the CPU (Central Processing Unit).

The CPICH despreading unit 51, upon receiving the received signal, despreads the received signal with a spreading code for CPICH at timing corresponding to each of multi-paths. The despread-and-thus-acquired pilot signals corresponding to the respective paths are branched into three groups and transmitted at timing with a shift of 1-slot time to the function units of the anterior slot data processing system 57, the target slot data processing system 58 and the posterior slot data processing system 59.

Each of the anterior slot data processing system 57, the target slot data processing system 58 and the posterior slot data processing system 59 has a RAKE receiving function. The target slot data processing system 58 is a main processing system related to the received pilot signal. To be specific, the target slot data processing system 58 RAKE-receives the pieces of received pilot symbol data (interference power estimation target) and sequentially outputs the data on a slot basis. Note that if the interference power estimation target slot is limited, only the pilot symbol data allocated to the target slot may also be output.

The anterior slot data processing system 57 RAKE-receives the pieces of pilot symbol data allocated to the slot anterior by one to the pilot symbol data processed by the target slot data processing system 58, and sequentially outputs the data on the slot basis. Namely, the pilot symbol data output from the anterior slot data processing system 57 become the pilot symbol data of the anterior slot that are referred to for obtaining the noise power related to the data output from the target slot data processing system 58.

The posterior slot data processing system 59 RAKE-receives the pieces of pilot symbol data allocated to the slot posterior by one to the pilot symbol data processed by the target slot data processing system 58, and sequentially outputs the data on the slot basis. Namely, the pilot symbol data output from posterior slot data processing system 59 become the pilot symbol data of the posterior slot that are referred to for obtaining the noise power related to the data output from the target slot data processing system 58.

The pilot signal acquiring unit 41 sends, to other function units, the pilot symbol data (the target slot data) as the interference power estimation target data, the pilot symbol data of the slot anterior to the target data and the pilot symbol data of the slot posterior to the target data, which are output from the respective processing systems, in the form of synchronizing these pieces of data.

In the target slot data processing system 58, with respect to the target slot, the synchronous detection unit 53-2 acquires the pilot signals taking phase-synchronization by multiplying the pilot symbol data corresponding to the respective paths that are sent from the CPICH despreading unit 51 by the channel estimation values about the paths that are sent from the channel estimation value calculating unit 52-2. Then, the RAKE-synthesization unit 54-2 synthesizes the pieces of pilot symbol data corresponding to the paths with the phase-synchronization being taken.

As to the anterior slot data processing system 57 and the posterior slot data processing system 59, the pieces of pilot symbol data of the slots are acquired in the same way as by the target slot data processing system 58.

The channel estimation value calculating units 52-1, 52-2, 52-3 respectively calculate the channel estimation values about the symbols of the pilot signals corresponding to the paths, which are transmitted from the CPICH despreading unit 51. At this time, the channel estimation value calculating units 52-1, 52-2, 52-3 individually calculate the channel estimation values from the average value of the pilot symbols (a second reference signal) for 1-slot time, which are allocated to the target slot.

Figure 6:
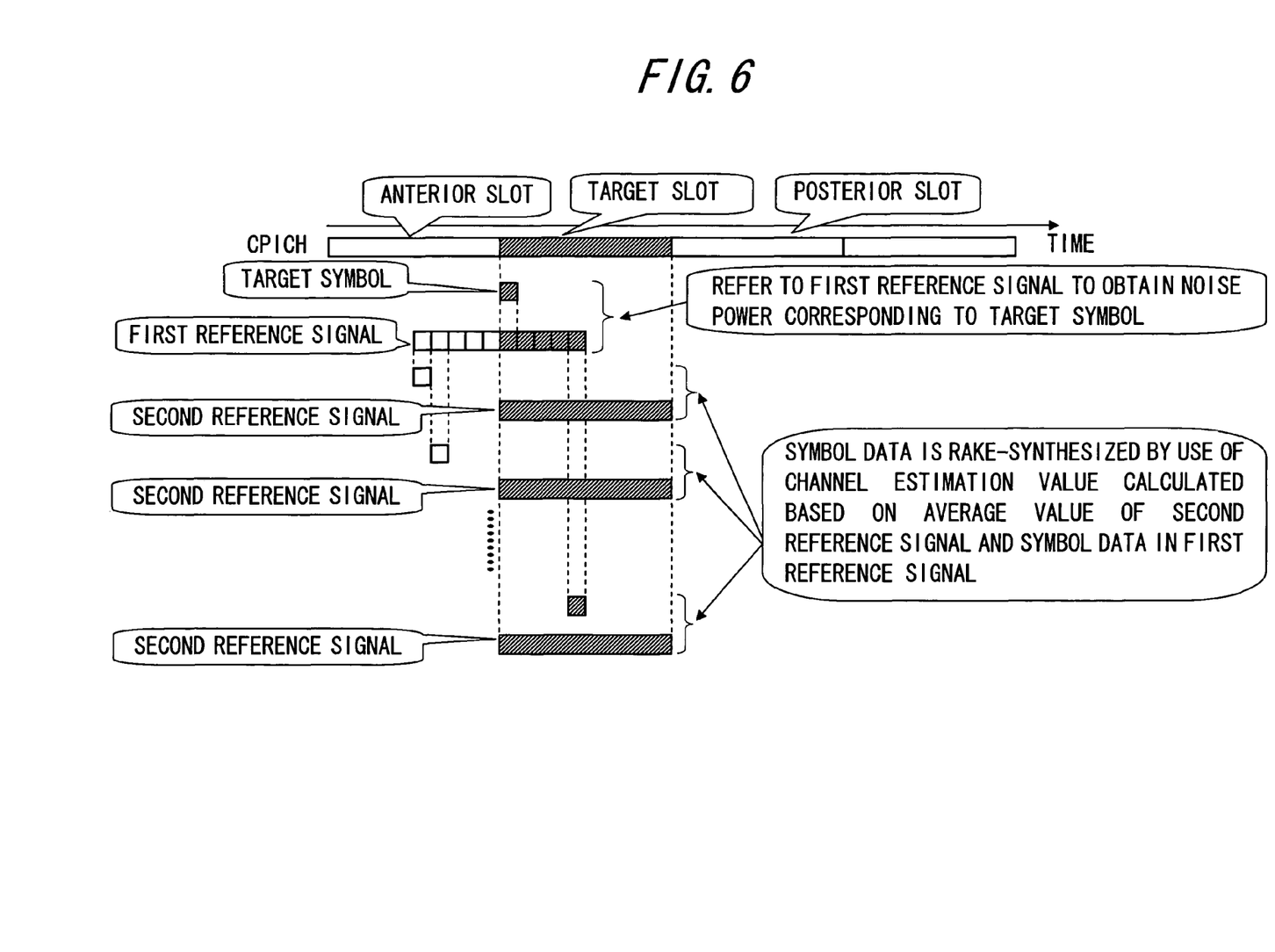
FIG. 6 is a diagram showing a method of acquiring pilot symbol data in the second embodiment.

FIG. 6 is a diagram showing a method of acquiring the pilot symbol data in the second embodiment. As illustrated in FIG. 6, each of the channel estimation value calculating units 52-1, 52-2, 52-3 utilizes, on the occasion of calculating the channel estimation values for each pilot symbol, the average value of the pilot symbols within the same slot (the target slot). Specifically, the channel estimation value calculating unit 52-1, on the occasion of calculating the channel estimation values about the pilot symbols allocated to the should-be-processed slot (the slot anterior by one to the target slot), uses the average value of the pilot symbols for 1-slot time that are allocated to the slot (the target slot) posterior by one to the should-be-processed slot. Further, the channel estimation value calculating unit 52-3, on the occasion of calculating the channel estimation values about the pilot symbols allocated to the should-be-processed slot (the slot posterior by one to the target slot), uses the average value of the pilot symbols for 1-slot time that are allocated to the slot (the target slot) anterior by one to the should-be-processed slot.

The average value of the pilot symbols for 1-slot time is defined as data having a 1-pilot-symbol length, which is obtained by adding up the pieces of pilot symbol data for 1-slot time and dividing the added pilot symbol data by the number of the pilot symbols in the slot. Each of the channel estimation value calculating units stores the average values as the reference symbol data for the channel estimation in the memory etc. Then, the channel estimation value calculating unit 52, when calculating the channel estimation value, reads from the memory the reference symbol data for the channel estimation corresponding to the target pilot symbol, and averages the data, thereby calculating the channel estimation value corresponding to each path.

Note that the average value may be, because of using the same value in each of the channel estimation value calculating units, calculated by one channel estimation value calculating unit, and the calculated average value may be shared with other channel estimation value calculating units. Further, the method of calculating the channel estimation value based on the pilot symbols may involve using a general type of method, and hence an in-depth description thereof is herein omitted.

Operation and Effect in Second Embodiment

As described above, in the interference power estimating device in the second embodiment, the pilot symbol data (main pilot signal) as the interference power estimation target data is transmitted to the speed detecting unit 11, the reference signal calculating unit 12 and the subtracting unit 13, and also the pieces of pilot symbol data of the slots anterior and posterior to the target symbol are transmitted to the reference signal calculating unit 12. The reference signal calculating unit 12 acquires, based on the speed information given from the speed detecting unit 11, a predetermined reference signal, if necessary, by making use of the pilot symbol data of the anterior and posterior slots.

The pilot signal acquiring unit 41 RAKE-receives the pilot symbol data (the main pilot signal) as the interference power estimation target data. Moreover, the pilot signal acquiring unit 41 RAKE-receives the pilot symbol data of the anterior slot and the pilot symbol data of the posterior slot in a form that corresponds to the target pilot symbol data.

On the occasion of RAKE-receiving these pieces of pilot symbols, the channel estimation value corresponding to each of the multi-paths is calculated with respect to each pilot symbol, then the synchronous detection thereof is done by use of these channel estimation values, and the pieces of pilot symbol data taking the phase synchronization about the paths are RAKE-synthesized.

The channel estimation value calculating unit 52 calculates, with respect to the pilot symbol data allocated to the target slot of the interference power estimation, the channel estimation value about each pilot symbol from a 1-symbol length average value of the pieces of pilot symbol data for 1-slot time of the target slot. Further, with respect to the pilot symbol data of the anterior slot and the posterior slot that are referred to for estimating the interference power of the target slot, the channel estimation values about the pilot symbols of the anterior slot and the posterior slot are calculated from the 1-symbol length average value of the pieces of pilot symbol data for 1-slot time of the target slot different from the slot to which the symbols thereof are allocated.

Namely, in the interference power estimating device according to the second embodiment, the reference signal (the second reference signal) used for calculating the channel estimation value on the slot basis for estimating the interference power is commonized.

With this scheme, though the data in positions far from the target slot are used for the channel estimation with the result that the fading fluctuations are treated as the noises in the related arts, according to the present embodiments, the channel estimation value is commonized based on the unit for obtaining the interference power, thereby enabling the channel estimation to be restrained from being affected by occurrence of the fading fluctuations.

<Others>

The disclosures of Japanese patent application No. JP2006-323437, filed on Nov. 30, 2006 including the specification, drawings and abstract are incorporated herein by reference.

What is claimed is:

1. An interference power estimating device, comprising:
a reference symbol acquiring unit to acquire a reference symbol corresponding to a target pilot symbol by symbol-averaging a reference signal including one or more pilot symbols being allocated in positions near in terms of time to the target pilot symbol, assuming each of pilot symbols included in a received signal to be the target pilot, wherein a number of the one or more pilot symbols is less than a number of pilot symbols within one slot;
an estimating unit to estimate interference power of the received signal by squaring each difference between the target pilot symbol and the reference symbol corresponding to the target pilot symbol acquired by the reference symbol acquiring unit;
a channel estimating unit to calculate a channel estimation value used for synchronously detecting each of the pilot symbols included in the reference signal by symbol-averaging the pilot symbols within a slot to which to allocate each of the pilot symbols and the pilot symbol corresponding to the reference symbol acquired from the reference signal; and
a speed estimating unit to estimate moving speed of a communication terminal in which the interference power estimating device is included;
wherein the reference symbol acquiring unit switches over so that the number of the pilot symbols included in the reference signal becomes smaller as the moving speed estimated by the speed estimating unit becomes higher.

2. The interference power estimating device according to claim 1, wherein the reference symbol acquiring unit acquires the reference symbol corresponding to the target pilot symbol by symbol-averaging the reference signal including the target pilot symbol and pilot symbols anterior and posterior to the target pilot symbol.

3. The interference power estimating device according to claim 1, wherein the reference symbol acquiring unit sets the reference symbol corresponding to the target pilot symbol as a pilot symbol neighboring to the target pilot symbol.

4. The interference power estimating device according to claim 1, further comprising a correcting unit to correct the interference power estimated by the estimating unit with a predetermined correction value,
wherein the correcting unit determines the predetermined correction value so as to correct a bias of the reference symbol to the target pilot symbol, corresponding to a structure of the reference signal that is changed over based on the moving speed estimated by the speed estimating unit.

5. An interference power estimating device comprising:
a pilot signal acquiring unit to acquire pilot symbols included in a received signal consists of a plurality of time slots, and outputting target pilot symbols within a target slot together with pilot symbols within a slot anterior to the target slot and pilot symbols within a slot posterior to the target slot;
a reference signal acquiring unit to acquire a first reference signal using channel estimation values calculated for the target slot, the slot anterior to the target slot, and the slot posterior to the target slot outputted by the pilot signal acquiring unit respectively based on a second reference signal obtained by symbol-averaging the pilot symbols within the target slot; and an estimating unit to estimate interference power of the received signal by squaring each difference between each of pilot symbols within the target slot and the first reference signal acquired by the reference signal acquiring unit.

6. The interference power estimating device according to claim 5, further comprising:

a plurality of channel estimating units, each of which calculates a channel estimation value for the target slot, the slot anterior to the target slot, or the slot posterior to the target slot based on a second reference signal calculated by one of the plurality of channel estimating units by symbol-averaging the pilot symbols within the target slot, or a respective second reference signal calculated by respective one of the plurality of channel estimating units by symbol-averaging the pilot symbols within the target slot.

7. An interference power estimating method executed in an interference power estimating device, comprising:

acquiring a reference symbol corresponding to a target pilot symbol by symbol-averaging a reference signal including one or more pilot symbols being allocated in positions near in terms of time to the target pilot symbol, assuming each of pilot symbols included in a received signal to be the target pilot, wherein a number of the one or more pilot symbols is less than a number of the pilot symbols within one slot;

estimating interference power of the received signal by squaring each difference between the target pilot symbol and the reference symbol corresponding to the target pilot symbol acquired in the acquiring step, by the interference power estimating device; and estimating a moving speed of a communication terminal in which the interference power estimating device is included;

wherein the acquiring step includes switching over so that the number of the pilot symbols included in the reference signal becomes smaller as the moving speed estimated in the estimating step becomes higher.

8. The interference power estimating method according to claim 7, wherein the acquiring step includes acquiring the reference symbol corresponding to the target pilot symbol by symbol-averaging the reference signal including the target pilot symbol and pilot symbols anterior and posterior to the target pilot symbol.

9. The interference power estimating method according to claim 7, wherein the acquiring step includes setting the reference symbol corresponding to the target pilot symbol as a pilot symbol neighboring to the target pilot symbol.

10. The interference power estimating method according to claim 7, further comprising correcting the interference power estimated in the estimating step with a predetermined correction value, wherein the correcting step includes determining the predetermined correction value so as to correct a bias of the reference symbol to the target pilot symbol, corresponding to a structure of the reference signal that is changed over based on the moving speed estimated in the estimating step.

11. The interference power estimating method according to claim 7, further comprising calculating a channel estimation value used for synchronously detecting each of the pilot symbols included in the reference signal by symbol-averaging the pilot symbols within a slot to which to allocate each of the pilot symbols and the pilot symbol corresponding to the reference symbol acquired from the reference signal.

12. A method performed by an interference power estimating device, the method comprising:

acquiring symbols include in a received signal consists of a plurality of time slots;

outputting target pilot symbols within a target slot together with pilot symbols within a slot anterior to the target slot and pilot symbols within a slot posterior to the target slot;

acquiring a first reference signal using channel estimation values calculated for the target slot, the slot anterior to the target slot, and the slot posterior to the target slot respectively based on a second reference signal obtained by symbol-averaging the pilot symbols within the target slot; and estimating interference power of the received signal by squaring each difference between each of pilot symbols within the target slot and the first reference signal.

* * * * *